United States Patent [19]

Thompson

[11] Patent Number: 4,642,925
[45] Date of Patent: Feb. 17, 1987

[54] X-RAY FILM MOUNT

[75] Inventor: Greg J. Thompson, Andover, Minn.

[73] Assignee: International Radiology Systems, Inc., Minneapolis, Minn.

[21] Appl. No.: 801,082

[22] Filed: Nov. 22, 1985

[51] Int. Cl.$^4$ .............................................. G09F 1/10
[52] U.S. Cl. ................... 40/158 B; 156/108; 428/41; 428/134
[58] Field of Search .............. 40/158 B; 156/108; 428/40, 41, 134, 137

[56] References Cited

U.S. PATENT DOCUMENTS

| | | | |
|---|---|---|---|
| 1,840,719 | 1/1932 | Hutchinson | 40/158 B |
| 2,291,173 | 7/1942 | Simpson | 40/158 B |
| 2,521,225 | 9/1950 | Kearney | 428/66 XR |
| 2,679,928 | 6/1954 | Bishop, Jr. et al. | 428/41 XR |
| 2,896,351 | 7/1959 | Johnson | 40/158 B |
| 3,431,667 | 3/1969 | Woods | 40/158 B |
| 3,536,555 | 10/1970 | Thompson, Jr. | 156/108 |
| 3,564,745 | 2/1971 | Johnson et al. | 40/158 B |
| 3,642,552 | 2/1972 | Sibley | 156/108 |
| 3,873,405 | 3/1975 | Wilkes | 40/158 B X |
| 4,112,165 | 9/1978 | Russell | 40/158 B X |
| 4,333,254 | 6/1982 | Stevenson | 40/158 B X |
| 4,351,124 | 9/1982 | Silvertsen et al. | 40/158 B |

FOREIGN PATENT DOCUMENTS 0042125 12/1981 European Pat. Off. .......... 40/158 B

Primary Examiner—Henry F. Epstein
Attorney, Agent, or Firm—Merchant, Gould, Smith, Edell, Welter, and Schmidt

[57] ABSTRACT

An improved mount (10) for X-ray film transparencies comprises a pair of sheets (12, 14) and a layer of pressure-sensitive adhesive (16) therebetween. Viewing openings (18) of identical size are provided through the sheets (12, 14). Rectangular die cuts (22) are provided only in the liner sheet (14) about rows of openings (18) to define removable portions (24) that can be peeled away to expose simultaneously portions of the adhesive layer (16) surrounding the viewing openings. Arcuate thumb cuts (26) are also provided in the liner sheet (14) to facilitate lifting and removal of the liner portions (24). Lines of perforations (28) are preferably provided in the sheets (12, 14) between the rectangular die cuts (22) so that the amount can be separated into rows of viewing openings (18) as desired.

7 Claims, 2 Drawing Figures

X-RAY FILM MOUNT

TECHNICAL FIELD

The present invention relates generally to the mounting of film transparencies. More particularly, this invention concerns an improved X-ray film mount by which transparencies can be mounted for viewing and/or filing more quickly and conveniently.

BACKGROUND ART

Radiographs or X-rays are often taken during medical and dental procedures, for either diagnosis or treatment. Multiple X-rays are typically taken, which must then be grouped by patient and subject matter for subsequent viewing and filing. Since it is inconvenient to handle multiple X-rays separately, it has heretofore been common practice to secure them in a mount for convenience of handling and to complete a patient's file.

Various film transparency mounts have been available heretofore. For example, U.S. Pat. No. 3,536,555 shows an apparatus and method for mounting X-ray films by means of an assembly jig. This mount comprises two sheets of paper, cardboard or the like, one sheet of which has pressure-sensitive adhesive on one side thereof. Both sheets have identically sized openings or apertures, which are relatively smaller than the X-ray films to be mounted, and aligned jig pin holes. Assembly of this mount requires exposing the adhesive by removing a peel away backing, and then positioning that sheet on the jig with the adhesive side up. The individual X-ray film transparencies are then positioned over the openings and adhesively secured in place about their peripheries, after which the second sheet is aligned on the jig and adhesively secured to the first sheet with the X-rays sandwiched therebetween in the openings. This approach thus involves the use of a mounting jig and a series of manipulations to assemble the sheets and film transparencies into a mount.

Another approach to the mounting of multiple film transparencies is illustrated in U.S. Pat. No. 3,564,745. This reference shows a transparency mount wherein aligned die-cut areas of different sizes are provided in the two sheets. These are adhered together but left in place until just prior to use, whereupon they are removed from the side of the sheet having the relatively larger die-cut areas so as to expose a framed adhesive mounting area surrounding the relatively smaller die-cut area in the other sheet. The relatively larger die-cut areas can surround one or more openings. It is theoretically possible with this mount to remove several smaller die-cut areas from the other sheet simultaneously upon removal of one large die-cut area in the other sheet simultaneously upon removal of one large die-cut area in the other sheet. However, this requires additional time and attention. Usually, removal of the large die-cut area from one sheet results in separation leaving the smaller die-cut areas in place in the other sheet. Therefore, in practice this transparency mount generally requires either individual removal of each corresponding pair of large/small die-cut areas, or first removal of the large die-cut area from one sheet followed by individual removal of the smaller die-cut areas from the other sheet. Again, a series of manipulations are required to assemble the sheets and film transparencies into a mount. Also, it will be appreciated that the formation of different sized die-cut areas in opposite sheets from different sides involves tolerance problems and thus more complication and waste during manufacture. Leaving the die-cut areas in place also increases weight and thus shipping costs.

The transparency mounts of the prior art have therefore tended to require undue manipulation of various pieces to complete assembly. This, of course, is time consuming and expensive, particularly in view of the trend toward increased utilization of X-rays in various diagnostic and treatment procedures. A need has thus arisen for an improved X-ray film mounting that requires fewer assembly steps and is quicker and more convenient.

SUMMARY OF THE INVENTION

The present invention comprises an improved X-ray film mount which overcomes the foregoing and other difficulties associated with the prior art quicker and more conveniently. In accordance with the invention, there is provided a transparency film mount which is particularly adapted for mounting of X-ray films. The mount comprises a pair of superposed sheets, one of which consists of a releasable liner attached by a layer of pressure-sensitive adhesive to the other base sheet. A plurality of viewing holes of identical size are punched through the sheets in mutually spaced-apart relationship. A rectangular die-cut is provided about groups of holes only in the liner sheet, and a thumbnail cut is provided at one end thereof to facilitate removal of that portion of the liner sheet to expose the adhesive so that films can then be mounted over the viewing openings in a simple and convenient two-step process. Since the adhesive around multiple viewing openings is exposed simultaneously upon removal of the die-cut portion from the liner sheet, separate blocking pieces are provided for covering any unused openings. If desired, perforations can be provided between the sheets and openings therein so that the mount can be separated into smaller mounts with fewer viewing openings.

BRIEF DESCRIPTION OF THE DRAWINGS

A better understanding of the invention can be had by reference to the following detailed description in conjunction with the accompanying drawings, wherein.

DETAILED DESCRIPTION

Figure 1:
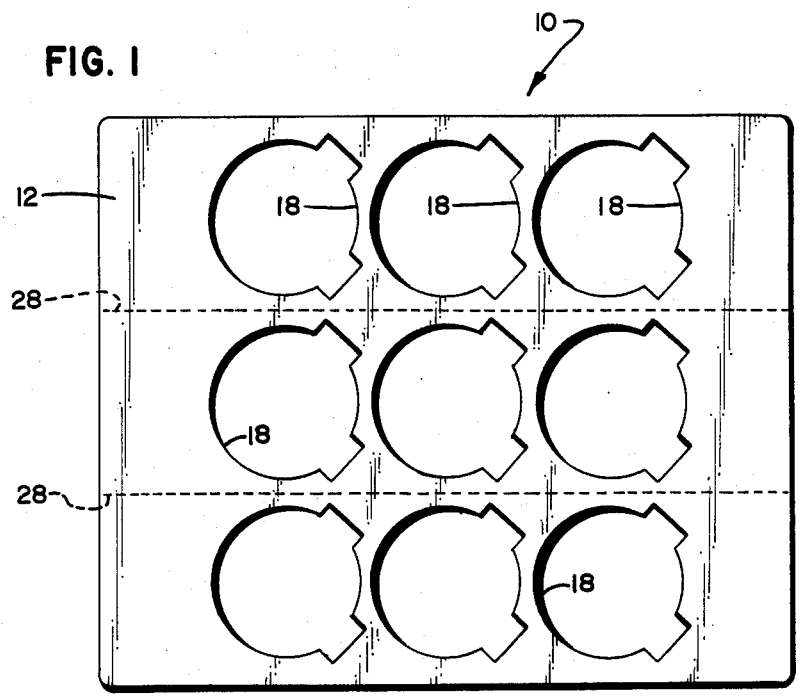
FIG. 1 is a front view of the transparency mount of the present invention.
Figure 2:
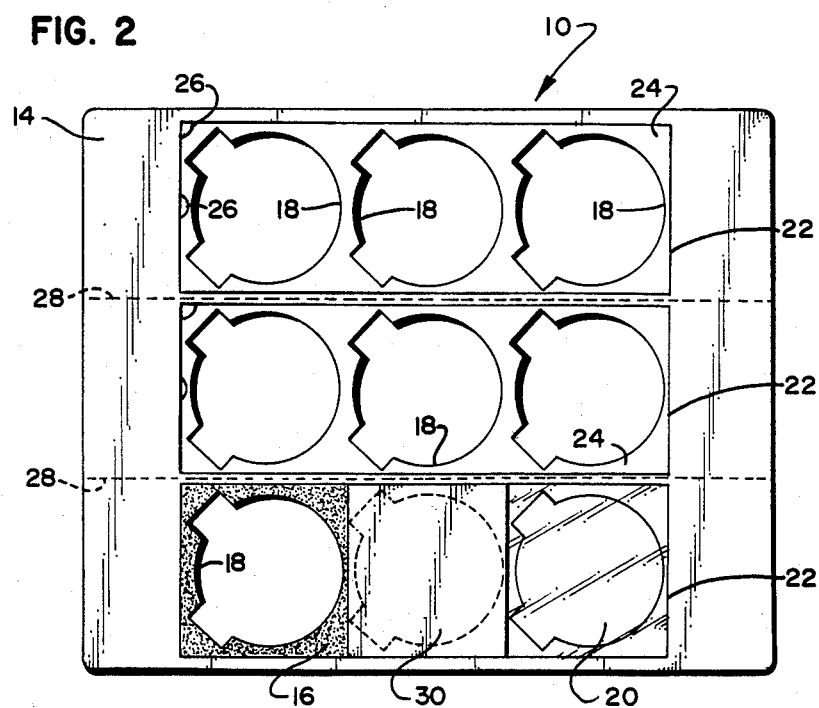
FIG. 2 is a back view of the transparency mount herein.

Referring now to the drawings, wherein like reference numerals designate like or corresponding elements between FIGS. 1 and 2, there is shown the improved X-ray film mount 10 incorporating the invention. The mount 10 comprises a pair of sheets 12 and 14 releasably secured together by means of a layer of pressure-sensitive adhesive 16 extending co-extensively between the sheets.

Sheets 12 and 14 and the adhesive layer 16 can be formed of any suitable materials. In the preferred embodiment, the base sheet 12 comprises a sheet of ten point paper with an offset black mat print coating so as to be opaque. The liner sheet 14 preferably comprises a relatively thinner releasable sheet, such as 80-pound release liner. The adhesive layer 16 is preferably pressure-sensitive adhesive of conventional type which remains tacky for several hours after exposure to allow attachment, removal and/or repositioning of a film transparency if desired, after which the adhesive sets to form a substantially permanent bond. For example, M902 pressure-sensitive adhesive from Mactac Adhesive of Stowe, Ohio, has been found satisfactory for use in the adhesive layer 16.

A plurality of viewing openings 18 are punched through both sheets 12 and 14 and adhesive layer 16 of mount 10. Each viewing opening 18 actually comprises a pair of identical aligned coincidental openings formed in sheets 12 and 14. As shown, nine viewing openings 18 are provided in the mount 10, although any suitable number can be utilized. The openings 18 are preferably shaped and dimensioned to be smaller than the X-ray film transparencies 20 to be mounted, providing sufficient peripheral attachment while leaving a good viewing area. As shown, the viewing openings 18 are of generally circular shape with a pair of rectangular tab-like outset portions.

Die-cuts 22 of rectangular shape are provided only in the liner sheet 14 in surrounding relationship with groups of viewing openings 18. It will be understood that the die-cuts 22 extend only through the liner sheet 14, but not into the base sheet 12. The die-cuts 22 can be formed by means of a conventional kiss-cutting technique from the liner side of mount 10, either before, after or simultaneously with formation of the viewing openings 18. As shown, the mount 10 includes three rectangular die cuts 22 in the liner sheet 14, each die cut surrounding a row of three viewing openings 18. The rectangular die cuts 22 in turn define removable liner portions 24 which normally cover the layer of adhesive 16 in the areas surrounding the viewing openings 18 in each row. Removal of each liner portion 24 thus simultaneously exposes the adhesive layer 16 around the openings 18 in the corresponding row so that the film transparencies 20 can then be directly secured in place over the openings without any additional manipulative steps.

In accordance with the preferred embodiment, each removable liner portion 24 includes a scallop-like thumbnail cut 26 adjoining the surrounding rectangular die-cut 22 therein to facilitate lifting and peeling off the portions to expose part of the adhesive layer 16. A thumbnail cut 26 is preferably located at one corner of each removable liner portion 24, although it can be located at one end, as illustrated, or at any other position around the rectangular die cut 22.

If desired, lines of perforations 28 can be provided through sheets 12 and 14 between adjacent die-cuts 22 so that the mount 10 can be separated into smaller mounts having fewer viewing openings 18.

FIG. 2 shows the removable liner portions 24 left in place over the top two rows of viewing areas 18. The removable liner portion 24 has been removed from the bottom row of viewing openings 18, with a film transparency 20 adhesively secured over one of the openings 18. Another one of the openings 18 in that row has been left open for illustration to show the mount 10 after removal of that liner portion 24 but before mounting of a film transparency 20, while the remaining opening has been closed with an opaque cover sheet 30 for blocking purposes when the mount is used with a light table. Cover sheet 30 can be formed of the same material as base sheet 12.

From the foregoing, it will thus be apparent that the present invention comprises an improved X-ray film mount having numerous advantages over the prior art. Film transparencies can be mounted by means of a simple and convenient two-step assembly involving removal of the die-cut liner portions and then placement of the film on the exposed adhesive over the viewing openings. The viewing openings are preformed and no additional mounting jig is necessary. The film mount herein also avoids the alignment and tolerance problems associated with forming die-cut areas in both sheets. Other advantages will be evident to those skilled in the art.

Although particular embodiments of the invention have been illustrated in the accompanying drawings and described in the foregoing Detailed Description, it will be understood that the invention is not limited only to the embodiments disclosed, but is intended to embrace any alternatives, equivalents, modifications and/or rearrangements of elements falling within the scope of the invention as defined by the following claims.

What is claimed is:

1. A mount for supporting a plurality of film transparencies for viewing, comprising in combination:
   a pair of superposed sheets having opposite sides and edges;
   a layer of pressure-sensitive adhesive extending coextensively between adjacent sides of said sheets;
   said sheets both including a plurality of aligned predetermined viewing openings of identical size and shape extending completely through said sheets;
   said viewing openings being arranged in a plurality of rows with each row including a plurality of viewing openings;
   only one of said sheets including a rectangular die cut therein surrounding one row of viewing openings in spaced relationship to define a removable portion which normally covers portions of said adhesive layer, but which, when removed, exposes portions of said adhesive layer surrounding the openings in the other sheet so that film transparencies can be mounted thereover; and
   said one sheet further including an arcuate die-cut adjoining the rectangular die cut to facilitate lifting and separation of the removable portion of said one sheet.

2. The mount of claim 1, wherein the viewing openings are of generally circular shape with two spaced-apart rectangular outsets.

3. The mount of claim 1, hwerein said one sheet comprises a release liner, and the other sheet comprises relatively thicker opaque paper.

4. The mount of claim 1, wherein said sheets further include lines of perforations extending between adjacent rows of openings and opposite edges of said sheets for facilitating separation of the mount into smaller groups of viewing openings.

5. The mount of claim 1, further including:
   at least one blocking sheet for covering any exposed view openings not having film transparencies mounted thereover.

6. A mount for supporting a plurality of film transparencies for viewing, comprising in combination:
   an opaque base sheet;
   a layer of pressure-sensitive adhesive coating one entire side of said base sheet;
   a releasable liner secured over said adhesive layer on said base sheet;
   said base sheet and said liner both including a plurality of rows of mutually spaced apart, aligned viewing openings of identical predetermined size and shape extending completely through said base sheet and said liner;

said liner only including a rectangular diecut therein surrounding each row of viewing openings in spaced relationship to define removable liner portions which normally cover portions of said adhesive layer, but which, when removed, expose said adhesive layer surrounding the viewing openings in said base sheet to permit mounting of film transparencies thereover;

each removable liner portion including an arcuate die-cut adjoining the rectangular cut to facilitate lifting and removal of the associated liner portion; and said base sheet and said liner further including lines of perforations extending between adjacent rectangular die cuts in said liner sheet to facilitate separation of the rows of viewing openings into smaller groups of viewing openings.

7. A method of mounting film transparencies, comprising the steps of:

providing an opaque base sheet with pressure-sensitive adhesive covering one side thereof;

providing a releasable liner sheet;

attaching the releasable liner to the adhesive side of the base sheet;

punching at least one row of aligned viewing openings of identical predetermined size and shape completely through both the base sheet and the liner sheet;

forming only in the liner sheet a rectangular cut in spaced relationship around each row of viewing openings to define a removable liner portion normally covering the adhesive portions surrounding the openings in the base sheet;

forming an arcuate thumb-cut in each removable liner portion adjoining the surrounding rectangular cut;

forming lines of perforations in the base sheet and liner sheet between adjacent rectangular cuts in the liner sheet to define separable mount portions;

removing each removable liner portion to expose the adhesive surrounding the row of viewing openings in the base sheet;

discarding the removed liner portion;

adhesively attaching a film transparency over at least one opening in the row; and adhesively attaching an opaque cover sheet over any unused viewing openings in the exposed row.

* * * * *